United States Patent [19]

Shibata et al.

[11] Patent Number: 4,774,162

[45] Date of Patent: Sep. 27, 1988

[54] PHOTOGRAPHIC ELEMENT

[75] Inventors: Takeshi Shibata; Tsumoru Hirano, both of Kanagawa, Japan

[73] Assignee: Fuji Photo Film Co., Ltd., Kanagawa, Japan

[21] Appl. No.: 39,561

[22] Filed: Apr. 17, 1987

[30] Foreign Application Priority Data

Apr. 17, 1986 [JP] Japan .................. 61-87180
Apr. 17, 1986 [JP] Japan .................. 61-87181

[51] Int. Cl.$^4$ .......................... G03C 5/54; G03C 7/00
[52] U.S. Cl. .................................. 430/213; 430/941; 430/545; 430/559; 526/258; 526/263
[58] Field of Search ............... 430/213, 518, 941, 630, 430/559, 545; 526/258, 263

[56] References Cited

U.S. PATENT DOCUMENTS

| | | | |
|---|---|---|---|
| 4,115,124 | 2/1978 | Hamilton | 430/518 |
| 4,273,853 | 6/1981 | Ponticello et al. | 430/213 |
| 4,450,224 | 5/1984 | Klein et al. | 430/213 |
| 4,585,724 | 4/1986 | Helling et al. | 430/213 |
| 4,594,308 | 6/1986 | Nakamura et al. | 430/213 |
| 4,619,883 | 10/1986 | Aono et al. | 430/213 |
| 4,636,455 | 1/1987 | Aono et al. | 430/213 |

OTHER PUBLICATIONS

Allowed U.S. application Ser. No. 07/086,245; Nakamura et al., filed 8/17/87.

*Primary Examiner*—Richard L. Schilling
*Attorney, Agent, or Firm*—Sughrue, Mion, Zinn, Macpeak & Seas

[57] ABSTRACT

A photographic element comprising a layer having a polymeric mordant which comprises repeating units represented by formula (I) and repeating units represented by at least one of formulae (II), (III) and (IV)

$$\begin{array}{c} R_1 \\ +CH_2-C+ \\ (L)_p^{}N \end{array} \begin{array}{c} R_2 \\ | \\ N \end{array} \quad (I)$$
$$\begin{array}{c} \\ R_4 \quad R_3 \end{array}$$

wherein $R_1$, $R_2$, $R_3$ and $R_4$ each represents a hydrogen atom or a straight or branched alkyl group,
L represents a divalent linking group, and
p represents 0 or 1;

$$\begin{array}{c} R_5 \\ | \\ +CH_2-C+ \\ | \\ A+R_6O)_{\overline{n}}R_7 \end{array} \quad (II)$$

wherein $R_5$ represents a hydrogen atom or a straight or branched alkyl group,
$R_6$ represents a divalent hydrocarbon group,
$R_7$ represents a hydrogen atom, a straight or branched alkyl group, an aryl group, or an aralkyl group,
A represents a divalent linking group bound to the main polymer chain through a carbon atom, and
n represents an integer of from 1 to 30;

$$\begin{array}{c} R_5' \\ | \\ +CH_2-C+ \\ | \\ O+C)_{\overline{l}}+X)_{\overline{m}}+R_6'O)_{\overline{n'}}-R_7' \\ \| \\ O \end{array} \quad (III)$$

$$\begin{array}{c} R_8' \quad O \\ | \quad \| \\ +CH_2-C+ \quad (C)_{\overline{l'}}+X')_{\overline{m'}}+R_6''O)_{\overline{n''}}-R_7'' \\ | \\ N \\ \diagdown \\ (C)_{\overline{l''}}+X'')_{\overline{m''}}+R_6'''O)_{\overline{q}}R_7''' \\ \| \\ O \end{array} \quad (IV)$$

wherein $R_5'$ and $R_8'$ each represents a hydrogen atom or a straight or branched alkyl group,
$R_6'$, $R_6''$, and $R_6'''$ each represents a divalent hydrocarbon group,
$R_7'$, $R_7''$, and $R_7'''$ each represents a hydrogen atom, a straight or branched alkyl group, an aryl group, or an aralkyl group,
X, X', and X'' each represents a divalent linking group,
l, l', l'', m, m', and m'' each represents 0 or 1,
n' and n'' each represents an integer of from 2 to 30, and
q represents an integer of from 0 to 30.

26 Claims, No Drawings

PHOTOGRAPHIC ELEMENT

FIELD OF THE INVENTION

This invention relates to a photographic element, and, more particularly, to a novel polymer which functions as an excellent mordant for dyes used in photographic elements, and to a photographic element using the polymer.

Still more particularly, it relates to a polymeric mordant (polymer mordant) for fixing imagewise formed diffusible dyes, and to a color photographic element comprising a layer containing this novel polymeric mardant.

BACKGROUND OF THE INVENTION

In the field of photographic art, it is known to use polymers having quaternary ammonium salts in side chains as a mordant described in U.S. Pat. Nos. 3,709,690, 3,958,995, 3,898,088, etc. However, such polymers have the defect that, though they show good mordanting properties for dyes, they are poor in their ability to retain mordanted dyes in a stable form. That is, a photographic system containing a dye image mordanted with this type mordant has the defect that the mordanted dye image is liable to undergo chemical change or decomposition when irradiated with light emitted from a fluorescent lamp, sunlight, or the like.

Polymeric mordants are usually coated on a support or other coated layer using a hydrophilic colloid such as gelatin as a binder. However, in comparison with coated layers formed of hydrophilic colloid alone, coated layers containing this type polymeric mordant and hydrophilic colloid show considerably different dynamic properties. That is, a layer formed of a mixture of polymeric mordant and, for example, gelatin, has been found to undergo serious reduction in tensile strength and elongation at break, in comparison with a layer formed of gelatin alone, and, as a result, is relatively brittle. This deterioration of the coated layer in terms of brittleness causes cracks due to thermal and dynamic strain generated in a layer-coating step or a layer-drying step and, therefore, seriously limits the production conditions such as coating conditions and drying conditions.

In addition, it has been found that, when thermal or dynamic strain is generated during handling of the dye-fixing element, it undergoes layer breakage (cracking) of the mordant layer contained therein.

When the aforesaid image-forming process is conducted using the thus cracked dye-fixing element, uneven development and/or uneven dye transfer result, or false cuts appear in the image; thus the image quality is seriously deteriorated.

SUMMARY OF THE INVENTION

It is, therefore, an object of the present invention to provide a mordant which shows excellent mordanting properties and which can retain a mordanted dye in a stable form against light, and to provide a photographic element using the mordant.

Another object of the present invention is to provide a photographic element having a mordant layer which is resistant to cracking.

These and other objects of the present invention will become apparent from the following descriptions thereof.

The above-described and other objects can be attained by a photographic element comprising a layer having a polymeric mordant which comprises repeating units represented by formula (I) and repeating units represented by at least one of formulae (II), (III) and (IV)

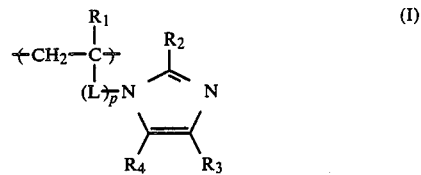

wherein
$R_1$, $R_2$, $R_3$ and $R_4$ each represents a hydrogen atom or a straight or branched alkyl group (preferably containing from 1 to 6 carbon atoms),
L represents a divalent linking group (preferably containing from 1 to 20 carbon atoms), and
p represents 0 or 1;

wherein
$R_5$ represents a hydrogen atom or a straight or branched alkyl group (preferably containing from 1 to 4 carbon atoms),
$R_6$ represents a divalent hydrocarbon group,
$R_7$ represents a hydrogen atom, a straight or branched alkyl group (preferably containing from 1 to 20 carbon atoms), an aryl group (preferably containing from 6 to 20 carbon atoms), or an aralkyl group (preferably containing from 7 to 20 carbon atoms),
A represents a divalent linking group bound to the main polymer chain through a carbon atom, and
n represents an integer of from 1 to 30;

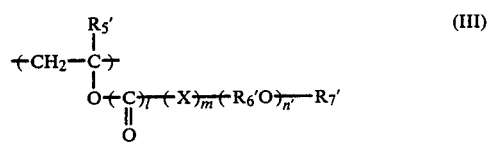

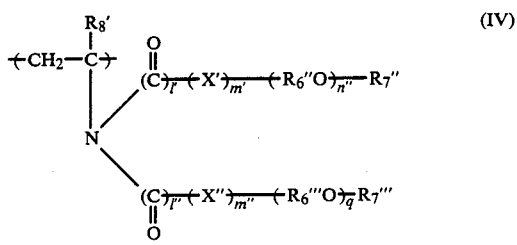

wherein
$R_5'$ and $R_8'$ each represents a hydrogen atom or a straight or branched alkyl group (preferably containing from 1 to 6 carbon atoms),
$R_6'$, $R_6''$ and $R_6'''$ each represents a divalent hydrocarbon group,
$R_7'$, $R_7''$ and $R_7'''$ each represents a hydrogen atom, a straight or branched alkyl group (preferably containing from 1 to 20 carbon atoms), an aryl group (preferably containing from 6 to 20 carbon atoms), or an aralkyl group (preferably containing from 7 to 20 carbon atoms), X, X' and X" each represents a divalent linking group, l, l', l"m, m' and m" each represents 0 or 1, n' and n" each represents an integer of from 2 to 30, and q represents an integer of from 0 to 30.

DETAILED DESCRIPTION OF THE INVENTION

Formulae (I), (II), (III) and (IV) are described in more detail below.

In formula (I), $R_1$, $R_2$, $R_3$ and $R_4$ each preferably represents a hydrogen atom or a lower alkyl group containing from 1 to 6 carbon atoms (e.g., a methyl group, an ethyl group, an n-propyl group, an n-butyl group, an n-amyl group, an n-hexyl group, etc.), with a hydrogen atom, a methyl group or an ethyl group being particularly preferable.

L represents a divalent linking group containing from 1 to about 20 carbon atoms such as an alkylene group (e.g., a methylene group, an ethylene group, a trimethylene group, a hexamethylene group, etc.), a phenylene group (e.g., an o-phenylene group, a p-phenylene group, an m-phenylene group, etc.), an arylenealkyl group (e.g.,

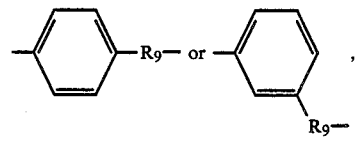

provided that $R_9$ represents an alkylene group containing 1 to 12 carbon atoms), $-CO_2-$, $-CO_2-R_{10}-$ (wherein $R_{10}$ represents an alkylene group, a phenylene group, or an arylenealkylene group),

(wherein $R_{11}$ represents an alkylene group, a phenylene group, or an aralkylene group, and $R_{12}$ represents a hydrogen atom, an alkyl group, or a phenyl group), or the like. Of these divalent linking groups,

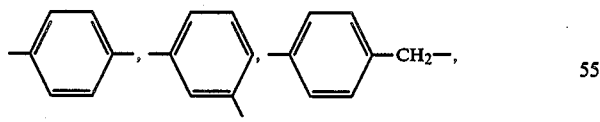

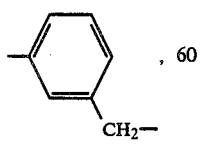

$-CO_2-$, $-CONH-$, $-CONHCH_2-$, $-CONHCH_2CH_2CH_2-$, $-CONHCH_2CH_2-$, $-CO_2-CH_2CH_2-$, $-CO_2-CH_2CH_2CH_2-$, etc., are particularly preferable. Preferable specific examples of the repeating units represented by formula (I) are shown below which, however, are not limitative at all.

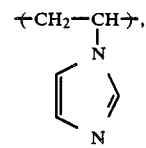

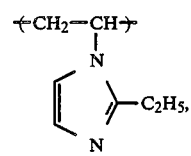

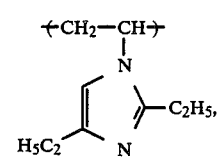

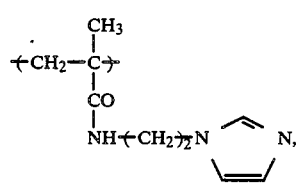

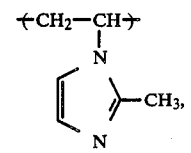

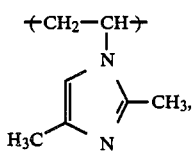

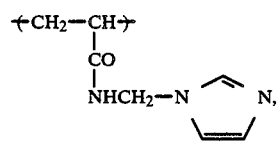

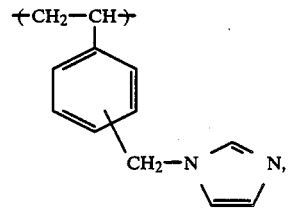

and

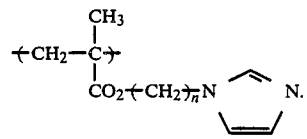

In formula (II), $R_5$ represents a hydrogen atom or an alkyl group (preferably containing from 1 to 4 carbon atoms, e.g., a methyl group, an ethyl group, etc.).

$R_6$ represents a divalent hydrocarbon group, and typical examples thereof include an alkylene group containing from 1 to 10 carbon atoms (e.g., a methylene group, an ethylene group, a propylene group, a 2,2-dimethyl-1,3-propylene group, a 2,2-dimethyl-1,6-hexylene group, etc.), an arylene group containing from 6 to 12 carbon atoms (e.g., a phenylene group, a naphthylene group, a xylylene group, etc.), an aralkylene group containing from 7 to 15 carbon atoms (e.g., a phenylenemethylene group, etc.), and a cycloalkylene group containing from 4 to 12 carbon atoms (e.g., a cyclobutylene group, a cyclohexylene group, etc.). Preferable examples of $R_6$ are an alkylene group and an arylene group, with an alkylene group being more preferable.

$R_7$ represents a hydrogen atom, an alkyl group (preferably containing from 1 to 20 carbon atoms, e.g., a methyl group, an ethyl group, an n-butyl group, an i-butyl group, a t-butyl group, a 2-ethylhexyl group, a tridecyl group, etc.), an aryl group (preferably containing from 6 to 20 carbon atoms, e.g., a phenyl group, a 4-methylphenyl group, a 4-t-butylphenyl group, a 4-methoxyphenyl group, etc.) or an aralkyl group (preferably containing from 7 to 20 carbon atoms, e.g., a phenylmethyl group). Preferable examples of $R_7$ are a hydrogen atom, an alkyl group, and a phenyl group, with an alkyl group being more preferable.

A preferably represents $-COO-(X)_m-$, $-CONR_{12}-(X)_m-$,

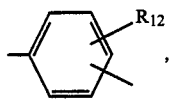, wherein $R_{12}$ represents a hydrogen atom, an alkyl group containing from 1 to 20 carbon atoms (e.g., a methyl group, an ethyl group, a propyl group, etc.), or $-(X)_m(-R_6O)_nR_7$, X represents a divalent linking group typically exemplified by $-R_{13}-COO-$, $-R_{14}OCO-$, $-R_{15}OCO-R_{16}COO-$, and

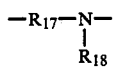

(wherein $R_{13}$, $R_{14}$, $R_{15}$, $R_{16}$ and $R_{17}$ each represents an alkylene group (e.g., a methylene group, an ethylene group, a propylene group, a 2,2-dimethyl-1,3-propylene group, etc.), an arylene group (e.g., a phenylene group, a naphthylene group, a xylene group, etc.) or an aralkylene group (e.g., a phenylenemethylene group, etc.), $R_{18}$ represents a hydrogen atom, an alkyl group (e.g., a methyl group, an ethyl group, a propyl group, etc.), or $-(R_6O)_mR_7$, m represents 0 or 1, and n represents an integer of from 1 to 30.

Preferable specific examples of the repeating units represented by formula (II) are shown below, but such examples are not limitative.

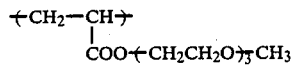

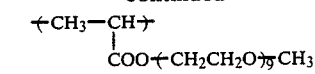

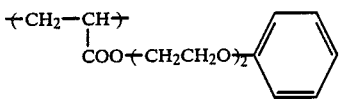

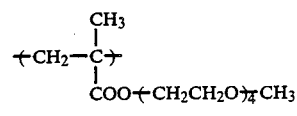

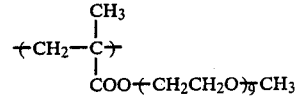

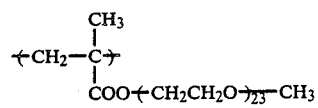

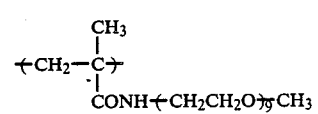

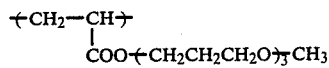

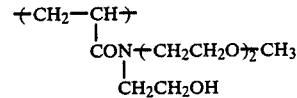

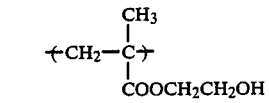

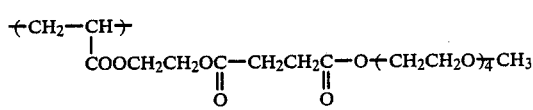

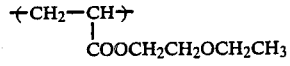

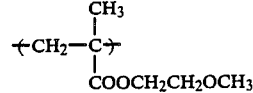

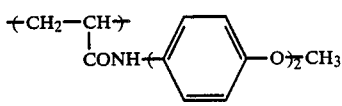

In formulae (III) and (IV), $R_5'$ and $R_8'$ each represents a hydrogen atom or an alkyl group containing from 1 to 6 carbon atoms (e.g., a methyl group, an ethyl group, etc.).

$R_6'$, $R_6''$ and $R_6'''$ each represents a divalent hydrocarbon group, and typical examples thereof include an alkylene group containing from 1 to 10 carbon atoms (e.g., a methylene group, an ethylene group, a propylene group, a 2,2-dimethyl-1,3-propylene group, a 2,2- dimethyl 1,6-hexylene group, etc.), an arylene group containing from 6 to 12 carbon atoms (e.g., a phenylene group, a naphthylene group, a xylene group, etc.), an aralkylene group containing from 7 to 15 carbon atoms (e.g., a phenylenemethylene group), and a cycloalkylene group containing from 4 to 12 carbon atoms (e.g., a cyclobutylene group, a cyclohexylene group, etc.). Preferable examples of $R_6'$, $R_6''$ and $R_6'''$ are an alkylene group and an arylene group, with an alkylene group being more preferable.

$R_7'$, $R_7''$ and $R_7'''$ each represents a hydrogen atom, an alkyl group containing from 1 to 20 carbon atoms (e.g., a methyl group, an ethyl group, an n-butyl group, an i-butyl group, a t-butyl group, a 2-ethylhexyl group, a tridecyl group, etc.), an aryl group containing from 6 to 20 carbon atoms (e.g., a phenyl group, a 4-methylphenyl group, a 4-t-butylphenyl group, a 4-methoxyphenyl group, etc.) or an aralkylene group containing from 7 to 20 carbon atoms (e.g., a phenylmethyl group, etc.). Preferable examples of $R_7'$, $R_7''$ and $R_7'''$ are an alkyl group and a phenyl group, with an alkyl group being more preferable.

X, X' and X'' each represents a divalent linking group, and typical examples thereof include $$-R_{13}-O-, -R_{13}-COO-, -R_{13}-OCO-,$$

$$-R_{13}-O-R_{14}-O-, -R_{13}-\underset{\underset{R_{15}}{|}}{N}-, -O-R_{13}-O-, \text{ and}$$

$$-R_{13}-OCO-R_{14}-COO-,$$

wherein $R_{13}$ and $R_{14}$ each represents an alkylene group (e.g., a methylene group, an ethylene group, a propylene group, a 2,2-dimethyl-1,3-propylene group, etc.), an arylene group (e.g., a phenylene group, a naphthylene group, a xylene group, etc.), or an aralkylene group (e.g., a phenylenemethylene group), and $R_{15}$ represents a hydrogen atom, an alkyl group (e.g., a methyl group, an ethyl group, a propyl group, etc.) or $-(R_6O)_mR_7$.

l, l' and l'', m, m' and m'' each represents 0 or 1, n' and n'' each represents an integer of from 2 to 30, and q represents an integer of from 0 to 30. n' and n'' each preferably represents an integer of from 3 to 30, and more preferably from 4 to 30.

Of those represented by formula (IV), preferable are repeating units represented by formula (V)

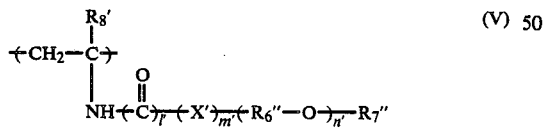       (V)

wherein $R_8'$, X', $R_6''$, $R_7''$, l', m' and n' are the same as defined hereinbefore.

Preferable specific examples of the repeating units represented by formulae (III) and (IV) are illustrated below, but such examples are not limitative.

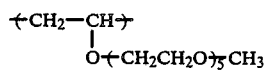

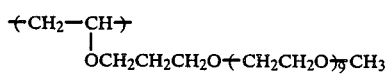

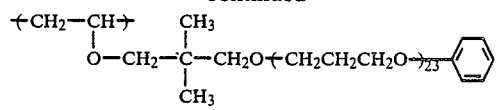

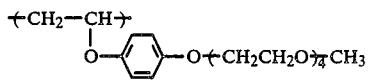

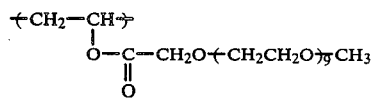

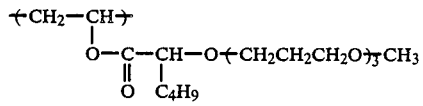

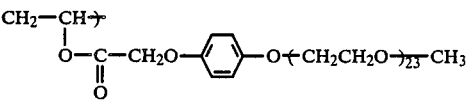

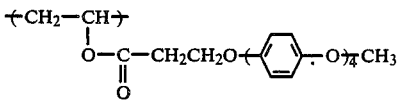

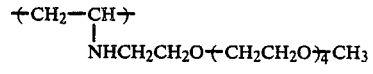

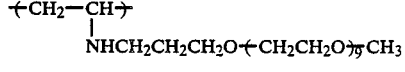

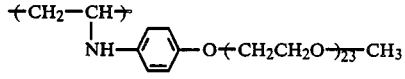

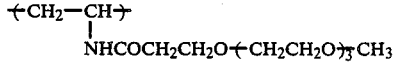

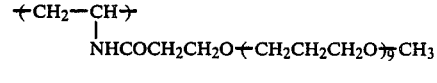

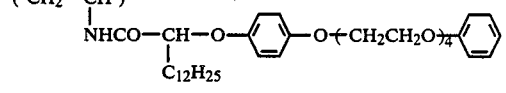

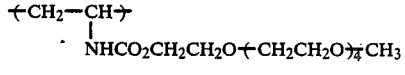

The polymeric mordant of the present invention may contain repeating units other than those represented by formulae (I), (II), (III) and (IV). Preferable examples of such other repeating units include acrylates (e.g., n-butyl acrylate), methacrylates (e.g., n-butyl methacrylate), acrylamides (e.g., diacetoneacrylamide), methacrylamides (e.g., n-butylmethacrylamide), styrenes (e.g., styrenesulfinic acid), etc. In addition, those comonomer units which are described in Japanese Patent Application (OPI) Nos. 122940/85, 235134/85, 46948/86 (the term "OPI" as used herein refers to a "published unexamined Japanese patent application"), etc., may be contained.

In the polymeric mordant of the present invention, the content of repeating units represented by formula (I) is preferably from about 10 to about 95 mol %, and more preferably from 40 to 90 mol %, based on the total repeating units, and the content of repeating units represented by formulae (II), (III) and/or (IV) is preferably from about 2 to about 70 mol %, and more preferably from 5 to 50 mol %, based on the total repeating units. For each of the repeating units represented by formulae (I), (II), (III) and (IV), two or more kinds of repeating units represented by the same formula may be used. As described hereinbefore, the polymeric mordant of the present invention may contain repeating units other than those represented by formulae (I), (II), (III) and (IV), but the content of such other repeating units is not more than 30 mol % based on the total repeating units.

The polymeric mordant of the present invention preferably has a molecular weight of from about $5 \times 10^3$ to about $1 \times 10^7$. If the molecular weight is too small, the polymeric mordant is too mobile, whereas if too large, coating thereof may be difficult. A more preferable molecular weight is from $1 \times 10^4$ to $2 \times 10^6$.

Specific preferable examples of the polymeric mordant to be used in the present invention are illustrated below which, however, do not limit the present invention in any way.

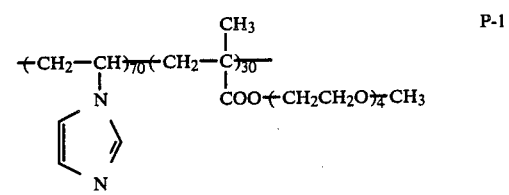

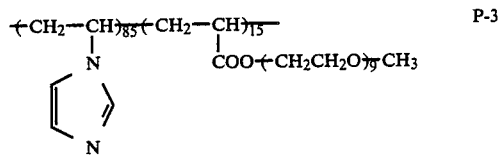

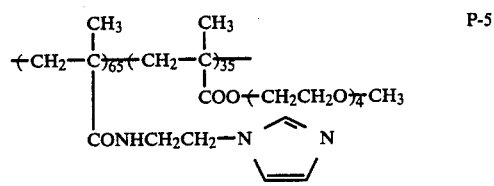

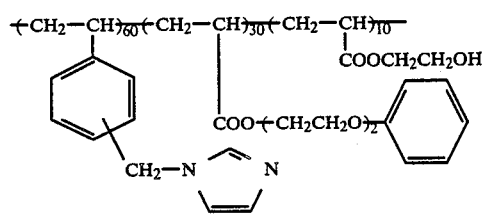

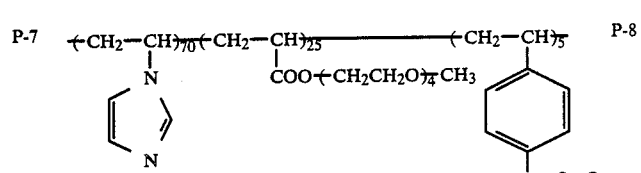

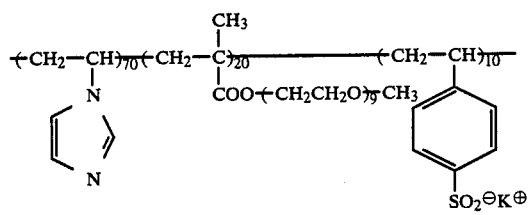

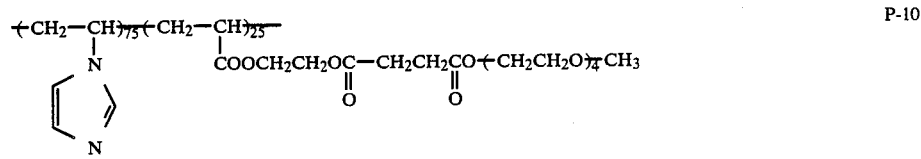

-continued
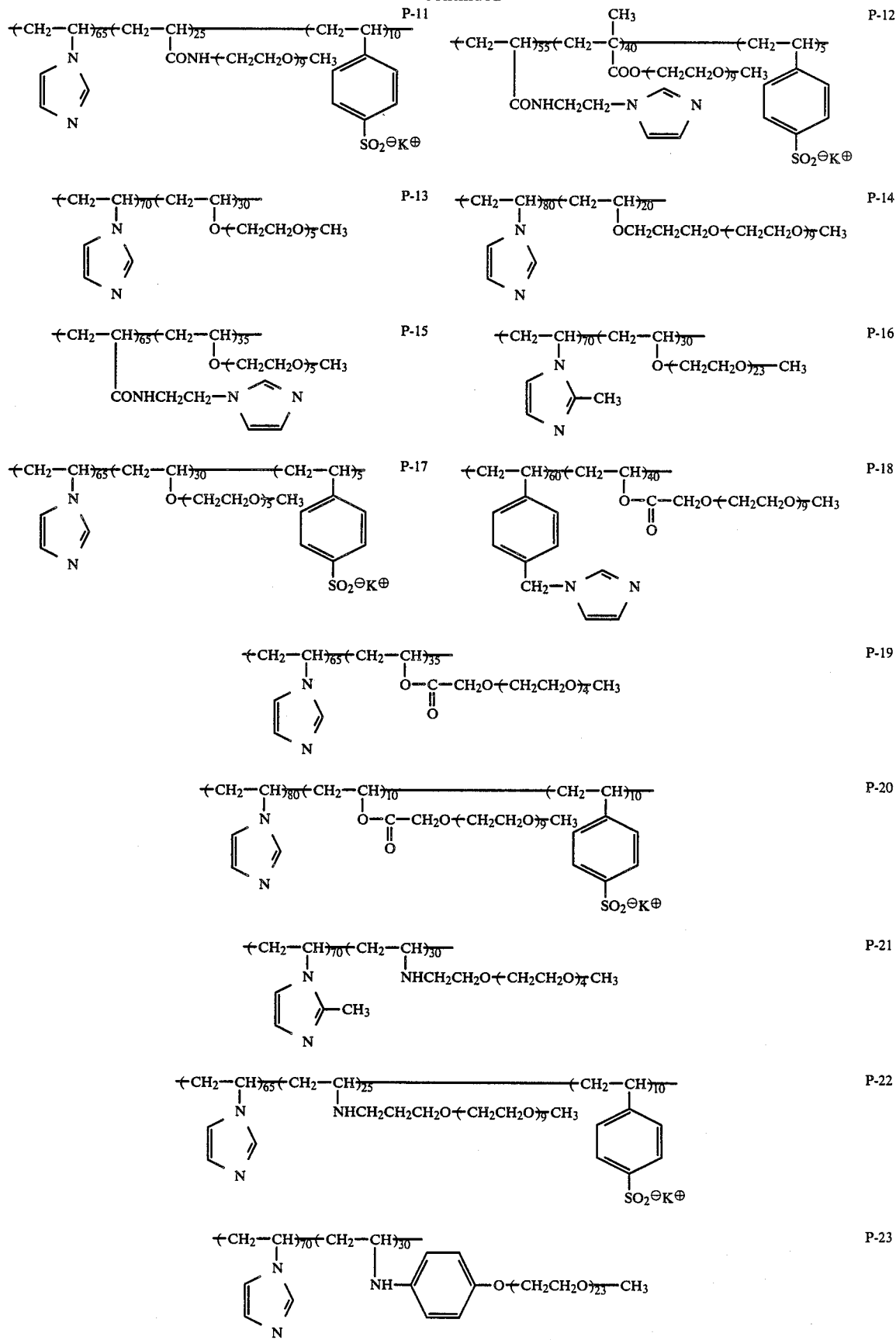

-continued

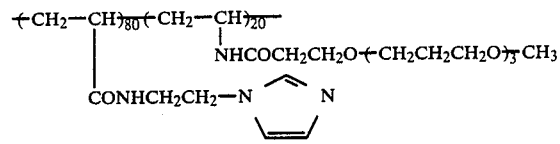

P-24

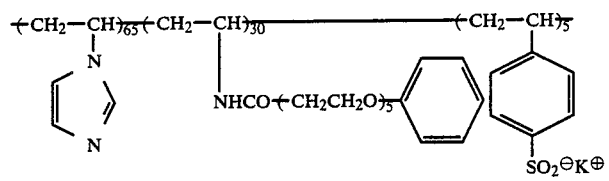

P-25

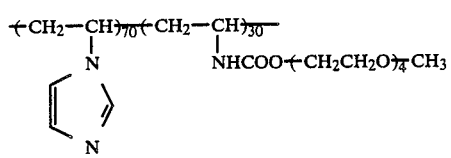

P-26

The polymeric mordants to be used in the present invention may be synthesized by conventionally known processes. Several examples thereof are shown below.

SYNTHESIS EXAMPLE 1

Synthesis of poly(1-vinylimidazole-co-methoxytetraethyleneglycol methacrylate) (P-1)

To a 500 ml three-neck flask were added 44.3 g of 1-vinylimidazole, 55.7 g of methoxytetraethyleneglycol methacrylate, and 300 ml of ethanol and, after thoroughly replacing the atmosphere with nitrogen gas, the mixture was heated to 75° C. When the temperature became constant, 1.242 g of 2,2'-azobis(2,4-dimethylvaleronitrile) was added thereto and, after continuing the heating for 2 hours, 1.242 g of 2,2'-azobis(2,4-dimethylvaleronitrile) was further added thereto. After continuing the heating for 3 hours, the reaction mixture was cooled to room temperature, and was placed in a cellulose tube to conduct dialysis for 2 days using city water. Lyophilization of the dialyzed product gave 89.5 g of the polymer.

SYNTHESIS EXAMPLE 2

Synthesis of poly(1-vinylimidazole-co-methoxynonaethyleneglycol methacrylate) (P-2)

To a 300 ml three-neck flask were added 21.9 g of 1-vinylimidazole, 28.1 g of methoxynonaethyleneglycol methacrylate, and 150.0 g of dimethylformamide and, after thoroughly replacing the atmosphere with nitrogen gas, the mixture was heated to 70° C. When the temperature became constant, 0.615 g of 2,2'-azobis(2,4-dimethylvaleronitrile) was added thereto, and, after continuing the stirring, 0.615 g of 2,2'-azobis(2,4-dimethylvaleronitrile) was further added thereto 2 hours after and 4 hours after the first addition thereof, respectively. Then, the heating was continued for 3 hours. The reaction mixture was cooled to room temperature, and poured into 1.5 liters of acetone, followed by vacuum drying to obtain 48.0 g of the polymer.

SYNTHESIS EXAMPLE 3

Synthesis of poly(1-vinylimidazole-co-methoxynonaethyleneglycol-co-potassium styrenesulfinate)

To a 500 ml three-neck flask were added 18.0 g of 1-vinylimidazole, 26.4 g of methoxynonaethyleneglycol methacrylate, 5.6 g of potassium styrenesulfinate, and 200 g of distilled water, and, after thoroughly replacing the atmosphere with nitrogen gas, the mixture was heated to 75° C. When the temperature became constant, 0.604 g of 2,2'-azobis(2-amidinopropane) hydrochloride was added thereto, and, while continuing the heating, 0.604 g of 2,2'-azobis(2-amidinopropane) hydrochloride was further added 2 hours after and 4 hours after the first addition, respectively. Then, the heating was continued for 3 hours. After cooling the reaction mixture to room temperature, an aqueous solution of the polymer was obtained.

SYNTHESIS EXAMPLE 4

Synthesis of poly(1-vinylimidazole-co-pentaethyleneglycol methyl vinyl ether) (P-13)

To a 500 ml three-neck flask were added 44.0 g of 1-vinylimidazole, 56.0 g of pentaethyleneglycol methyl vinyl ether, and 300 ml of ethanol, and, after thoroughly replacing the atmosphere with nitrogen gas, the mixture was heated to 75° C. When the temperature became constant, 1.242 g of 2,2'-azobis(2,4-dimethylvaleronitrile) was added thereto, and, while continuing the heating, 1.242 g of 2,2-azobis(2,4-dimethylvaleronitrile) was further added thereto 2 hours after the first addition thereof. Then, the heating was continued for 3 hours, and the reaction mixture was cooled to room temperature and placed in a cellulose tube to conduct dialysis for 2 hours using city water, followed by lyophilization to obtain 78.2 g of the polymer.

SYNTHESIS EXAMPLE 5

Synthesis of poly(1-vinylimidazole-co-α-methyltetraethyleneglycol vinyl acetate) (P-19)

To a 300 ml three-neck flask were added 18.7 g of 1-vinylimidazole, 31.3 g of α-methyltetraethyleneglycol vinyl acetate, and 150.0 g of dimethylformamide and, after thoroughly replacing the atmosphere within the flask with nitrogen gas, the mixture was heated to 70° C. When the temperature became constant, 0.615 g of 2,2'-azobis(2,4-dimethylvaleronitrile) was added thereto, and, while continuing the heating, 0.615 g of 2,2'-azobis(2,4-dimethylvaleronitrile) was added thereto 2 hours after and 4 hours after the first addition thereof, respectively. Then, the heating was continued for 3 hours, and the reaction mixture was cooled to room temperature, followed by pouring it into 1.5 liters of acetone. Lyophilization of the solution gave 41.6 g of the polymer.

SYNTHESIS EXAMPLE 6

Synthesis of poly(1-vinylimidazole-co-α-methylnonaethyleneglycol vinyl acetate-co-potassium styrenesulfinate) (P-20)

To a 500 ml three-neck flask were added 51.2 g of 1-vinylimidazole, 34.8 g of α-methylnonaethyleneglycol vinyl acetate, 14.0 g of potassium styrenesulfinate, and 300 g of distilled water, and, after thoroughly replacing the atmosphere within the flask with nitrogen gas, the mixture was heated to 75° C. When the temperature became constant, 0.904 g of 2,2'-azobis(2-amidinopropane) hydrochloride was added thereto, and while continuing the heating, 0.904 g of 2,2'-azobis(2-amidinopropane) hydrochloride was further added thereto 2 hours after and 4 hours after the first addition thereof, respectively. Then, the heating was continued for 3 hours. After cooling the reaction solution to room temperature, there was obtained an aqueous solution of the polymer.

The polymeric mordant of the present invention is used in a mordant layer of a photographic element alone or together with a binder. As the binder, hydrophilic binders may be used. Typical examples of the hydrophilic binder are transparent or semitransparent hydrophilic colloids, and include proteins such as gelatin, gelatin derivatives, etc.; natural materials such as cellulose derivatives, polysaccharides (e.g., starch, gum arabic, etc.); and synthetic polymers such as polyvinyl alcohol, polyvinyl pyrrolidone, polyacrylamide, etc.

Of these, gelatin and polyvinyl alcohol are particularly preferable.

The mordant layer may be in a light-sensitive material or in a dye-fixing material adopted for diffusion transfer process or thermally developing photographic process.

The mixing ratio of the polymeric mordant of the present invention to the binder, and the amount of the polymeric mordant to be coated may be easily decided by those skilled in the art, depending upon the amount of dye to be mordanted, the kind and composition of the polymeric mordant, and the image-forming process to be employed. Generally, the mordant/binder ratio is generally from about 20/80 to about 80/20 by weight, and the amount of mordant to be coated is preferably from about 0.2 to about 15 g/m², and more preferably from 0.5 to 8 g/m².

The mordant layer containing the polymeric mordant of the present invention may contain various surfactants for the purpose of enhancing coating properties, and the like.

In addition, the polymeric mordant of the present invention permits use of a gelatin hardener in the mordant layer.

As the gelatin hardener to be used in the present invention, there are illustrated, for example, aldehydes (e.g., formaldehyde, glyoxal, glutaraldehyde, etc.), N-methylol compounds (e.g., dimethylolurea, methyloldimethylhydantoin, etc.), dioxane derivatives (e.g., 2,3-dihydroxydioxane, etc.), active vinyl compounds (e.g., 1,3,5-triacryloylhexahydro-s-triazine, bis(vinylsulfonyl) methyl ether, N,N'-ethylenebis(vinylsulfonylacetamide), N,N'-trimethylenebis(vinylsulfonylacetamide, etc.), active halogen compounds (e.g., 2,4-dichloro-6-hydroxy-s-triazine, etc.), mucohalogenic acids (e.g., mucochloric acid, mucophenoxy chloric acid, etc.), epoxy compounds, isoxazoles, dialdehyde starch, 1-chloro-6-hydroxytriazinyl gelatin, etc. Specific examples thereof are described in U.S. Pat. Nos. 1,870,354, 2,080,019, 2,726,162, 2,870,013, 2,983,611, 2,992,109, 3,047,394, 3,057,723, 3,103,437, 3,321,313, 3,325,287, 3,362,827, 3,490,911, 3,539,644, 3,543,292, British Patents Nos. 676,628, 825,544, 1,270,578, West German Patents Nos. 872,153, 1,090,427, 2,749,260, Japanese Patent Publication Nos. 7133/59, 1872/71, etc.

Of these gelatin hardeners, aldehydes, active vinyl compounds, active halogen compounds, and epoxy compounds described in U.S. patent application Ser. No. 919,116, filed on Oct. 15, 1986 are particularly preferable.

These hardeners may be directly added to a mordant layer-forming coating solution, but may be added to other coating solution so that the hardener diffuses into the mordant layer during multilayer coating.

The amount of the gelatin hardener to be used in the present invention may freely be selected depending upon the end use, but is usually from about 0.1 to about 50 wt% based on the gelatin used, with from 1 to 30 wt% being preferable.

Combined use of the polymeric mordant of the present invention with a metal ion in a dye-fixing material (element) serves to enhance transfer density of dye. Such metal ion may be added to a mordantcontaining mordant layer or a layer adjacent thereto (either on the side nearer to a support carrying the mordant layer or on the side farther to the support). The metal ion used is desirably colorless and stable against heat and light. Polyvalent ions of transition metals such as $Cu^{2+}$, $Zn^{2+}$, $Ni^{2+}$, $Pt^{2+}$, $Pd^{2+}$, $Co^{3+}$, etc., are preferable, with $Zn^{2+}$ being particularly preferable. This metal ion is usually added in the form of a watersoluble compound such as $ZnSO_4$ or $Zn(CH_3CO_2)_2$, generally in an amount of from about 0.01 to about 5 g/m², and preferably from 0.1 to 1.5 g/m².

In the layer to which these metal ions are added may be used a hydrophilic polymer as a binder. As the hydrophilic binder, transparent, or semitransparent hydrophilic colloids as have been specifically referred to with respect to mordant layer are useful.

Examples of image-forming dyes to be mordanted to the photographic element of the present invention include azo dyes, azomethine dyes, anthraquinone dyes, naphthoquinone dyes, styryl dyes, nitro dyes, quinoline dyes, carbonyl dyes, phthalocyanine dyes, etc., having an anionic group such as a phenolic hydroxy group, a sulfonamido group, a sulfonic acid group, a carboxyl group, etc.

The photographic element of the present invention is particularly advantageous for a color imageforming process which comprises imagewise forming or releasing diffusible dyes and then fixing the diffusible dyes.

The above-described color image-forming processes include various types of processes such as a process of developing using a developer at about room temperature (color diffusion transfer process) (described, for example, in Belgian Patent No. 757,959), a process of thermal developing in the substantial absence of water (thermally developing process) (described, for example, in European Patent No. 76,492A2, Japanese Patent Application (OPI) Nos. 79247/83, 218443/84 and 238056/86, etc.), and the like, and the photographic element of the present invention may be used for any of these processes.

Dye-providing substances useful for the abovedescribed color image-forming processes are represented by the following formula (V), and are used in association with a silver halide emulsion

Dy-Y    (V)

wherein Dy represents a dye moiety (or its precursor moiety), and Y represents a group which, as a result of development, causes change in diffusibility of the dye-providing substance (V).

The term "change in diffusibility" as used . herein means (1) that initially nondiffusible dye-providing substance (V) becomes diffusible or releases a diffusible dye, or (2) that initially diffusible dye-providing substance (V) becomes nondiffusible. This change is caused either by oxidation of Y or by reduction of Y, according to the particular properties of Y.

The examples of compounds undergoing "change in diffusibility" caused by oxidation of Y include socalled dye-releasing redox substrates such as p-sulfonamidonaphthols (including p-sulfonamidophenols; specific examples being described in Japanese Patent Application (OPI) Nos. 33826/73, 50736/78, European Patent 76,492), o-sulfonamidophenols (including o-sulfonamidonaphthols; specific examples being described in Japanese Patent Application (OPI) Nos. 113624/76, 12642/81, 16130/81, 16131/81, 4043/82, 650/82, U.S. Pat. No. 4,053,312 and European Patent No. 76,492), hydroxysulfonamido heterocyclic compounds (specific examples being described in Japanese Patent Application (OPI) No. 104343/76 and European Patent No. 76,492), 3-sulfonamidoindoles (specific examples being described in Japanese Patent Application (OPI) Nos. 104343/76, 46730/78, 130122/79, 85055/82 and European Patent No. 76,492), α-sulfonamidoketones (specific examples thereof being described in Japanese Patent Application (OPI) Nos. 3819/78, 48534/79 and European Patent No. 76,492), and the like.

Another examples thereof include intramolecular assist type substrates described in Japanese Patent Application (OPI) Nos. 20735/82 and 65839/84 which release dyes by intramolecular nucleophilic attack of oxidized Y.

Further examples thereof include those substrates which release a dye by intramolecular cyclization reaction under basic condition, but which, when Y is oxidized, substantially do not release the dye (specific examples thereof being described in Japanese Patent Application (OPI) No. 63618/75). As a variation thereof, those substrates which undergo recyclization of isoxazolone ring by the attack of a nucleophilic reagent to release a dye are also useful (specific examples thereof being described in Japanese Patent Application (OPI) Nos. 111628/74 and 4819/77).

As still further examples, there are illustrated those which release a dye moiety by dissociation of acidic proton under basic condition, but which, wehn Y is oxidized, substantailly do not release the dye (specific examples thereof being described in Japanese Patent Application (OPI) Nos. 69033/78 and 130927/79).

On the other hand, examples which undergo change in diffusibility by reduction of Y include nitro compounds described in Japanese Patent Application (OPI) No. 110827/78, and quinone compounds described in Japanese Patent Application (OPI) No. 110827/78, U.S. Pat. Nos. 4,356,249 and 4,358,525. These compounds are reduced with a reducing agent not having been consumed in the preceding developing step but remaining in the system (hereinafter referred to as electron donor), and release a dye by the intramolecular attack of a nucleophilic group produced as a result of the reduction. As a variation thereof, quinone type substances are also useful which release a dye moiety by dissociation of the acidic proton from the reduced products (specific examples thereof being described in Japanese Patent Application (OPI) Nos. 130927/79 and 164342/81).

In the case of using the above-described substrates which undergo change in diffusibility by reduction, it is necessary to use a proper reducing agent (electron donor) which mediates between exposed silver halide and a dye-providing substance. Specific examples thereof are described in the above-mentioned documents. In addition, those substrates wherein an electron donor coexists in Y (called LDA compounds) are also useful.

As another type dye-providing substances, those which contain a dye moiety and which, when subjected to oxidation reduction reaction with silver halide or an organic silver salt at elevated temperatures, undergo change in the mobility thereof may be used. Such substances are described in Japanese Patent Application (OPI) No. 165054/84.

Japanese Patent Application (OPI) No. 180548/84 describes dye-providing substances which release a mobile dye by the reaction with silver ion in a light-sensitive material.

The photographic element of the present invention may be used in combination with a light-sensitive element adopted for color diffusion transfer process which is to be developed with a developer at about room temperature, or with a thermally developable lightsensitive element which is to be developed by heating.

As the silver halide to be used in the above-described light-sensitive elements, any of silver chloride, silver bromide, silver chlorobromide, silver chloroiodide, and silver chlorobromoiodide may be used.

Specifically, any of those silver halide emulsions which are described in U.S. Pat. No. 4,500,626, Research Disclosure, June, 1978, pp. 9 and 10 (RD 17029), Japanese Patent Application (OPI) Nos. 107240/86, 225176/85, U.S. patent application Ser. No. 917,642, filed on Oct. 10, 1986, etc., may be used.

The silver halide emulsion to be used in the present invention may be of the type forming a latent image mainly on the surface of silver halide particles, or of the type forming latent image mainly within particles. In addition, silver halide emulsions containing silver halide particles which have a core and a shell layer different from each other in phase, called core-shell type emulsions, may be used. Further, direct reversal type emulsions wherein an internal latent image-forming emulsion is combined with a nucleating agent may also be used.

Silver halide emulsions may be used as primitive emulsions, but are generally chemically sensitized to use. Chemical sensitization may be conducted according to sulfur sensitization process, reduction sensitization process, noble metal sensitization process, etc., known with emulsions for ordinary light-sensitive materials, alone or in combination. The chemical sensitization may be conducted in the presence of a nitrogen-containing heterocyclic compounds (Japanese Patent Application (OPI) Nos. 126526/83 and 215644/83).

The light-sensitive silver halide to be used in the present invention is coated at a coverage of 1 mg/m$^2$ to 10 g/m$^2$ of silver.

Silver halides to be used in the present invention may be spectrally sensitized with methine dyes or the like. Dyes to be used include cyanine dyes, merocyanine dyes, complex cyanine dyes, complex merocyanine dyes, holopolar cyanine dyes, hemicyanine dyes, styryl dyes, and hemioxonol dyes.

Specific examples include sensitizing dyes described in Japanese Patent Application (OPI) Nos. 180550/84, 140335/85, *Research Disclosure*, June, 1978, pp. 12 and 13 (RD 17029), etc., and heat-decolorable sensitizing dyes described in Japanese Patent Application (OPI) No. 111239/85, U.S. patent application Ser. No. 893,851, filed on Aug. 6, 1986, etc.

These sensitizing dyes may be used individually or as a combination thereof. A combination of sensitizing dyes is often employed, particularly for the purpose of supersensitization.

The sensitizing dyes may be present in the emulsion together with dyes which themselves do not give rise to any spectrally sensitizing effects, but which exhibit a supersensitizing effect when used in combination, or materials which do not substantially absorb visible light, but which exhibit a supersensitizing effect when used in combination. Examples thereof are described in U.S. Pat. Nos. 2,933,390, 3,635,721, 3,743,510, 3,615,613, 3,615,641, 3,617,295 and 3,635,721).

These sensitizing dyes may be added to an emulsion upon, before, or after chemical ripening, or before or after formation of nuclei of silver halide particles, according to the techniques described in U.S. Pat. Nos. 4,183,756 and 4,225,666.

The sensitizing dyes are generally added in an amount of $10^{-8}$ to $10^{-2}$ mol per mol of silver halide.

The photographic element of the present invention may be provided on a support different from that of a light-sensitive element, or may be in a form of a film unit wherein it is combined with a light-sensitive element.

One typical embodiment of the film unit comprises a transparent support having provided thereon the above-described image-receiving element and the light-sensitive element and does not require to peel the light-sensitive element apart from the image-receiving element after completion of transferring image. More specifically, the image-receiving element comprises at least one mordant layer and, in a preferable embodiment, the light-sensitive element is constituted by a combination of a blue-sensitive emulsion layer, a green-sensitive emulsion layer, and a red-sensitive emulsion layer, a combination of a green-sensitive emulsion layer, a red-sensitive emulsion layer, and an infrared light-sensitive emulsion layer, or a combination of a blue-sensitive emulsion layer, a red-sensitive emulsion layer, and an infrared light-sensitive emulsion layer, with each of these emulsion layers being associated with a yellow dye-providing substance, a magenta dye-providing substance, and a cyan dye-providing substance. (The term "infrared light-sensitive emulsion layer" as used herein means an emulsion layer which responds to light of longer than 700 nm, particularly longer than 740 nm, in wavelength.) A white reflective layer containing a solid pigment such as titanium oxide is provided between the mordant layer and the light-sensitive layer or layer containing a dye-providing substance so as to view the transferred image through the transparent support. In order to complete development processing in a bright room, a light barrier layer may further be provided between the white reflective layer and the light-sensitive layer. If desired, a peeling layer may be provided in a proper position for wholly or partly peeling the light-sensitive element apart from the image-receiving element. (Such embodiment is described, for example, in Japanese Patent Application (OPI) No. 67840/81 and Canadian Patent No. 674,082.)

In another peeling-free embodiment, the aforementioned light-sensitive element is coated on a transparent support, a white reflective layer is coated thereon, and, further, an image-receiving layer is coated thereon. An embodiment which comprises a support having provided thereon an image-receiving element, a white reflective layer, a peeling layer, and a light-sensitive element and which is designed to intentionally peel the light-sensitive element apart from the image-receiving element is described in U.S. Pat. No. 3,730,718. On the other hand, typical embodiments wherein the light-sensitive element and the image-receiving element are respectively coated on different supports are roughly grouped into two types, one being the peeling-apart type, and the other being the peeling-free (integral) type. These are described in more detail below. The peeling-apart type film unit has a light reflective layer on the back side of a support, with at least one image-receiving layer being coated on the surface of the support, and the light-sensitive element is coated on another support having a light barrier layer and is so designed that, before completion of exposure, the light-sensitive layer-coated side does not face the mordant layer-coated side but, after completion of exposure (for example, during development processing), the light-sensitive layer-coated side is turned to face the image-receiving layer-coated side. After completion of transfer image formation in the mordant layer, the light-sensitive element is immediately peeled apart from the image-receiving element.

In a preferable embodiment of peeling-free type film unit, at least one mordant layer is coated on a transparent support, whereas a light-sensitive element is coated on a transparent or light barrier layer-having support, with the light-sensitive layer-coated side facing the mordant layer-coated side.

Any of the above-described embodiments may be applied to both color diffusion transfer process and thermally developing process. With the former process, a pressure-rupturable container (processing element) containing an alkaline processing solution may further be combined. Above all, with the peeling-free film units wherein the image-receiving element and the light-sensitive element are provided on a single support, this processing element is preferably positioned between the light-sensitive element and a cover sheet to be superposed on the light-sensitive element. In the embodiment wherein the light-sensitive element and the image-receiving element are respectively coated on two different supports, the processing element is preferably positioned between the light-sensitive element and the image-receiving element upon development processing at the latest. The processing element preferably contains a light barriering agent (e.g., carbon black, dye with pH-dependent color, etc.) and/or a white pigment (titanium oxide, etc.) according to the form of particular film unit. Further, with film units adopted for the color diffusion transfer process, a neutralization-timing mechanism comprising a combination of a neutralizing layer and a neutralization-timing layer is preferably incorporated in a cover sheet, an image-receiving element, or a light-sensitive element.

On the other hand, in film units adopted for thermally developing process, a heat-generating layer containing conductive particles such as metallic fine particles, carbon black, graphite, etc., may be provided in a proper position of a support, light-sensitive element, or image-receiving element to thereby utilize Joule's heat generated upon energizing the heat-generating layer for conducting thermal development and diffusion transfer of dyes. The conductive particles may be replaced by semiconductive inorganic materials (for example, silicon carbide, molybdenum silicide, lanthanum chloride, barium titanate ceramics, tin oxide, zinc oxide, etc.).

The present invention is described in more detail by reference to thermally developable light-sensitive materials.

In the case of applying the present invention to thermally developable light-sensitive materials, organic metal salts may be used as oxidants together with silver halide. In this case, the light-sensitive silver halide must be in contact with, or within a close physical relation to, the organic metal salts.

Of such organic metal salts, organic silver salts are particularly preferably used.

The organic compounds to be used for forming the above-described organic silver salt oxidants include those compounds which are described in Japanese Patent Application (OPI) No. 107240/86, U.S. Pat. No. 4,500,626, etc. In addition, silver salts of carboxylic acids having an alkynyl group such as silver phenylpropiolate; and silver acetylide described in Japanese Patent Application (OPI) No. 249044/86 are also useful. The organic silver salts may be used as a combination of two or more.

The above-described organic silver salts are generally used in an amount of from 0.01 to 10 mols, and preferably from 0.01 to 1 mol, per mol of light-sensitive silver halide. The total amount of light-sensitive silver halide and the organic silver salt is 50 mg/m$^2$ to 10 g/m$^2$, in terms of the silver coverage.

The aforesaid dye-providing substances and hydrophobic additives such as image formation accelerating agents to be described hereinafter may be introduced into the light-sensitive element according to known processes, described, for example, in U.S. Pat. No. 2,322,027. In this case, high boiling point organic solvents as described in Japanese Patent Application (OPI) Nos. 83154/84, 178451/84, 178452/84, 178453/84, 178454/84, 178455/84, 178457/84, etc., may be used in combination with, if necessary, low boiling point organic solvents having a boiling point of from 50° to 160° C.

The high boiling point organic solvent is used in an amount of up to 10 g, preferably up to 5 g, per g of dye-providing substance used.

In addition, a dispersing process using a polymer described in Japanese Patent Publication No. 39853/76 and Japanese Patent Application (OPI) No. 59943/76 may also be employed.

With substantially water-insoluble compounds, they may be dispersed in a binder as fine particles in order to incorporate them, in addition to the aforementioned processes.

In dispersing hydrophobic materials in a hydrophilic colloid, various surfactants may be used. For example, those illustrated in Japanese Patent Application (OPI) No. 157636/84 as surfactants may be used.

In the present invention, a reducing substance is desirably incorporated in the light-sensitive element. Such reducing substances include the aforementioned dye-providing substances having reducing ability as well as those which are generally known as reducing agents. In addition, reducing agent precursors are also included which themselves do not possess reducing ability but acquire reducing ability by the action of a nucleophilic reagent or heat in the developing step.

The examples of the reducing agents to be used in the present invention include those reducing agents which are described in U.S. Pat. Nos. 4,500,626 and 4,483,914, Japanese Patent Application (OPI) Nos. 140335/85, 128438/85, 128436/85, 128439/85, 128437/85, etc. Reducing agent precursors described in Japanese Patent Application (OPI) Nos. 138736/81, 40245/82, U.S. Pat. No. 4,330,617, etc., may also be employed.

Combinations of various reducing agents as described in U.S. Pat. No. 3,039,869 may also be used.

In the present invention, the reducing agent is generally added in an amount of from 0.01 to 20 mols, and particularly preferably from 0.1 to 10 mols, per mol of silver.

In the present invention, those compounds which activate development and stabilize the formed image may be used in the light-sensitive element. Specific compounds preferably used are described in U.S. Pat. No. 4,500,626.

In the present invention, various antifoggants or photograph stabilizers may be used. For example, azoles or azaindenes described in *Research Disclosure* (December, 1978), pp. 24 and 25, nitrogen-containing carboxylic acids and phosphoric acids described in Japanese Patent Application (OPI) No. 168442/84, mercapto compounds and metal salts thereof described in Japanese Patent Application (OPI) No. 111636/84, acetylene compounds described in U.S. patent application Ser. No. 917,642, filed on October 10, 1986, etc., may be used.

In the present invention, image color toning agents may be used in the light-sensitive element. Specific examples of effective toning agents are described in Japanese Patent Application (OPI) No. 147244/86.

In order to obtain a wide range of colors within the chromaticity diagram using three primary colors (yellow, magenta and cyan), the light-sensitive element to be used in the present invention must contain at least three silver halide emulsion layers having light sensitivity in different spectrum regions. For example, there are a combination of three layers of blue-sensitive layer, green-sensitive layer and red-sensitive layer, a combination of three layers of green-sensitive layer, red-sensitive layer, and infrared light-sensitive layer, etc. Each of these light-sensitive layers may further be divided into two or more layers.

The light-sensitive element to be used in the present invention may have, if desired, various additives known for thermally developable light-sensitive materials, and layers other than light-sensitive layers such as a protective layer, an intermediate layer, an antistatic layer, an antihalation layer, a peeling layer which facilitates peeling the light-sensitive element apart from the dye-fixing element, a matting layer, etc. The various additives include plasticizers, matting agents, sharpness-improving dyes, antihalation dyes, surfactants, fluorescent whitening agents, slipping agents, antioxidants, anti-fading agents, etc., described in *Research Disclosure*, June, 1978, pp. 9 to 15, Japanese Patent Application (OPI) No. 88256/86, etc.

In particular, organic or inorganic matting agents are usually incorporated in the protective layer for preventing adhesion. In addition, mordants and ultraviolet ray absorbents may be incorporated in the protective layer. The protective layer and the intermediate layer may respectively be constituted by two or more layers.

In the intermediate layer may be incorporated a reducing agent for preventing fading or color mixing, an ultraviolet ray absorbent, and a white pigment such as titanium dioxide. The white pigment may be added not only to the intermediate layer, but also to an emulsion layer for the purpose of improving sensitivity.

In the image-receiving element (hereinafter referred to as "dye-fixing element"), auxiliary layers may be provided, such as a protective layer, a peeling layer, an anti-curling layer, etc. It is particularly useful to provide a protective layer. In one or more of the above-described layers may be incorporated a hydrophilic thermal solvent, a plasticizer, an anti-fading agent, an ultraviolet ray absorbent, a slipping agent, a matting agent, an antioxidant, a dispersed vinyl compound for increasing dimensional stability, a surfactant, a fluorescent whitening agent, etc. In addition, in the system wherein thermal development and dye transfer are simultaneously conducted in the presence of a small amount of water, it is preferable to incorporate a base and/or a base precursor to be described hereinafter in the dye-fixing element in view of enhancing preservability of the light-sensitive element. Specific examples of these additives are described in Japanese Patent Application (OPI) No. 88256/86.

In the present invention, an image formation-promoting agent may be used in the light-sensitive element and/or the dye-fixing element. The image formation-promoting agents perform a function of promoting the oxidation reduction reaction between a silver salt oxidant and a reducing agent, a function of promoting formation of a dye from a dye-providing substance, decomposition of a dye, or release of a diffusible dye, and a function of promoting migration of a dye from a light-sensitive element layer to a dyefixing layer, and are classified, in view of physical and chemical functions, into bases or base precursors, nucleophilic compounds, high boiling point organic solvents (oils), thermal solvents, surfactants, compounds performing mutual action with silver or silver ion, etc. However, these substances generally possess a plurality of these physical and chemical functions and usually perform some of the above-described promoting effects. Detailed descriptions on these compounds are given in Japanese Patent Application (OPI) No. 93451/86.

In addition to the above-described techniques, there are various techniques for producing bases, and compounds used in such techniques are all useful as the base precursors. For example, there is a technique for producing a base by mixing a slightly soluble metal compound with a compound capable of causing complex-forming reaction with a metal ion constituting the slightly soluble metal compound (called complex-forming compound) described in European Patent No. 210,660A and U.S. patent application Ser. No. 890,442,filed on July 30, 1986 and a technique for producing a base by electrolysis described in Japanese Patent Application (OPI) No. 232451/86.

In particular, the former technique is effective. Examples of the slightly soluble metal compound include carbonates, hydroxides, oxides, etc., of zinc, aluminum, calcium, barium, etc. The complex-forming compounds are described in detail, for example, in A. E. Martell & R. M. Smith, *Critical Stability Constants*, Vol. 4 and Vol. 5 (Plenum Press). Specifically, there are illustrated salts of aminocarboxylic acids, iminodiacetic acids, pyridylcarboxylic acids, aminophosphoric acids, carboxylic acids (mono-, di-, tri-, and tetra carboxylic acids, and compounds further having substituents such as phosphono, hydroxy, oxo, ester, amido, alkoxy, mercapto, alkylthio, phosphino, etc.), hydroxamic acids, polyacrylates, etc., with alkali metals, guanidines, amidines, quaternary ammonium salts, etc.

The slightly soluble metal compound and the complex-forming compound are advantageously separately added to the light-sensitive element and the dye-fixing element.

Various development-stopping agents may be used in the light-sensitive element and/or the dye-fixing element of the present invention for the purpose of constantly obtaining a definite image for varied processing temperatures and processing time upon development.

The term "development-stopping agents" as used herein means those compounds which, after proper development, rapidly neutralize, or react with, the base, to reduce the concentration of base in the film and thus stop development, or perform mutual action with silver and silver salts to inhibit development. Specific examples include acid precursors which release an acid upon being heated, electrophilic compounds which cause substitution reaction with a copresent base upon being heated, nitrogen-containing heterocyclic compounds, mercapto compounds, and precursors thereof (for example, those compounds which are described in Japanese Patent Application (OPI) Nos. 108837/85, 192939/85, 230133/85 and 230134/85).

Those compounds which release a mercapto compound upon being heated are also useful, and examples thereof are described in Japanese Patent Application (OPI) Nos. 67851/86, 147244/86, 124941/86, 185743/86, 182039/86, 185744/86, 184539/86, 188540/86 and 53632/86.

As the binder for the light-sensitive element and/or the image-fixing element of the present invention, hydrophilic binders may be used. Typical hydrophilic binders are transparent or semitransparent hydrophilic binders and include natural materials such as proteins (e.g., gelatin, gelatin derivatives, etc.), and polysaccharides (e.g., cellulose derivatives, starch, gum arabic, etc.), and synthetic polymers such as water-soluble polyvinyl compounds (e.g., polyvinyl pyrrolidone, acrylamide polymer, etc.). In addition, a dispersed vinyl compound may be used in a latex form for increasing dimensional stability of photographic materials. These binders may be used alone or as a combination thereof.

In the present invention, the binder is coated in an amount of up to 20 g, preferably up to 10 g, and more preferably up to 7 g, per m$^2$.

As to the proportion of the high boiling point organic solvent to be dispersed in the binder together with such hydrophobic compounds as dye-providing substances based on the binder, the solvent is used in an amount of up to 1 cc, preferably up to 0.5 cc, and more preferably up to 0.3 cc, per g of the binder.

The light-sensitive element and/or the dye-fixing element of the present invention may contain in their constituent layers (e.g., photographic emulsion layers, dye-fixing layers, etc.) an inorganic or organic hardener.

Specific examples of such hardeners are described in Japanese Patent Application (OPI) Nos. 147244/86 and 157636/84 which may be used alone or in combination.

In order to promote dye migration, a hydrophilic thermal solvent which is solid at ordinary temperature and becomes molten at elevated temperature may be incorporated in the light-sensitive element or the dye-fixing element. The hydrophilic thermal solvent may be incorporated in either, or both, of the light-sensitive element and the dye-fixing element. A specific layer in which the thermal solvent is to be incorporated may be any of an emulsion layer, an intermediate layer, a protective layer, and a dye-fixing layer, but the thermal solvent is preferably incorporated in a dye-fixing layer and/or an adjacent layer thereto. The hydrophilic thermal solvent is exemplified by ureas, pyridines, amides, sulfonamides, imides, alcohols, oximes, other heterocyclic compounds, etc. In order to promote dye migration, a high boiling point organic solvent may be incorporated in the light-sensitive element and/or the dye-fixing element.

Supports to be used in the light-sensitive element and/or the dye-fixing element to be used in the present invention must stand the processing temperatures. As the supports, glasses, papers, polymer films, metals, and analogues thereof are used. In addition, those which are described in Japanese Patent Application (OPI) No. 147244/86 as supports may also be used.

The light-sensitive element and/or the dye-fixing element may take the form of having an electrical conductive heat-generating layer as heating means for conducting thermal development or diffusion transfer of dyes.

The transparent or opaque heat-generating element to be used in such elements may be prepared by utilizing conventional techniques known as heating resistors. As the heating resistor, there is a technique of utilizing a thin membrane of an inorganic material showing semiconductivity, and a technique of utilizing an organic thin membrane containing dispersed therein conductive fine particles. Materials to be used in these techniques are described in Japanese Patent Application (OPI) No. 29835/86.

In the present invention, the coating technique described in U.S. Pat. No. 4,500,626 may be applied to coating of the thermally developable light-sensitive layer, protective layer, intermediate layer, subbing layer, backing layer, dye-fixing layer, and the like.

As the light source for imagewise exposing the light-sensitive element to record image therein, radiation rays including visible light may be used. Generally, light sources used for ordinary color prints, such as a tungsten lamp, a mercury lamp, a halogen lamp (e.g., an iodo lamp), a xenon lamp, a laser light source, light-emitting diode (LED), etc., described in Japanese Patent Application (OPI) No. 147244/86 and U.S. Pat. No. 4,500,626 may be used.

In the present invention, the thermally developing step and the dye-transferring step may be conducted independently or at the same time, or may be conducted continuously in the sense in which the transferring step is conducted subsequent to the developing step in one step.

Examples thereof include (1) a process of imagewise exposing the light-sensitive element, and, after heating, superposing the dye-fixing element thereon, and, if necessary, heating the assembly to transfer mobile dyes to the dye-fixing element; and (2) a process of imagewise exposing the light-sensitive element and heating it with the dye-fixing element superposed thereon. The above-described two processes (1) and (2) may be conducted in the substantial absence of water or in the presence of a slight amount of water.

Operable heating temperatures to be employed in the thermally developing step are generally from about 50° to about 250° C., with from about 80° to about 180° C. being particularly preferred. In the case of heating in the presence of a slight amount of water, the upper limit of heating temperature is not higher than the boiling point. Where image-transferring step is conducted after completion of the thermally developing step, heating temperatures in the image-transferring step may be the temperature employed in the thermal developing step to room temperature, but are more preferably from 50° C. to a temperature lower than that of the thermal developing step by about 10° C.

An image-forming process preferable in the present invention comprises conducting heating in the presence of a slight amount of water and a base and/or a base precursor after or simultaneously with imagewise exposure, to thereby transfer diffusible dyes produced in areas corresponding or countercorresponding to the silver image simultaneously with the development to the dye-fixing layer. According to this process, the reaction of thus producing or releasing diffusible dyes proceeds so rapidly and diffusible dyes migrate to the dye-fixing layer so rapidly that a color image with high density can be obtained in a short time.

The amount of water to be used in this embodiment may be as small as at least 0.1 times that of the total weight of the coatings of the light-sensitive element and the dye-fixing element, and preferably is from 0.1 times to the weight of solvent corresponding to the maximum swelling volume of the whole coatings (particularly, not more than the amount calculated by subtracting the total weight of the coatings from the weight of the solvent corresponding to the maximum swelling volume of the whole coatings).

The swollen coatings are in an unstable state, and, under some conditions, blurring can locally take place. In order to avoid this blurring, the amount of water is preferably not more than the weight of water corresponding to the maximum swelling volume of the whole coatings of the light-sensitive element and the dye-fixing element. Specifically, the amount of water is generally from 1 g to 50 g, preferably from 2 g to 35 g, and more preferably 3 g to 25 g, per m$^2$ of the sum of the area of the light-sensitive element and that of the dye-fixing element.

The base and/or base precursor to be used in this embodiment may be incorporated in the light-sensitive element or the dye-fixing element. In addition, they may be aupplied by dissolving in water.

In the above-described embodiment, it is preferable to incorporate in the image-forming reaction region a slightly water-soluble basic metal compound and a compound capable of undergoing complex-forming reaction with the metal ion which constitutes the slightly water-soluble metal compound as base precursors using water as a medium, so as to increase the pH of the region upon heating by the reaction between the two compounds. The terminology "image-forming reaction region" as used herein means the region where the image-forming reaction takes place. Specifically, layers belonging to the light-sensitive element and the dye-fixing element are included. Where two or more such layers exist, the region may be any of them.

The slightly soluble compound and the complexforming compound must be added to different layers in order to prevent them from reacting with each other before development processing. For example, in the so-called monosheet materials wherein the light-sensitive element and the dye-fixing element are provided on the same support, it is preferred to add the two compounds to different layers spaced apart from each other by at least one intermediate layer. In a more preferable embodiment, the slightly soluble metal compound and the complex-forming compound are incorporated in different layers provided on different supports. For example, it is preferable to incorporate the slightly soluble metal compound in the light-sensitive element and the complexforming compound in the dye-fixing element having a support different from that of the light-sensitive element. The complex-forming compound may be supplied by dissolving in water to be allowed to coexist. The slightly soluble compound is preferably incorporated as a fine particle dispersion prepared by the processes described in Japanese Patent Application (OPI) Nos. 174830/81, 102733/78, etc., with the average particle size being not more than 50 μm, and particularly preferably not more than 5 μm. The slightly soluble metal compound may be added to any of the light-sensitive layer, intermediate layer, protective layer, or the like of the light-sensitive element, or may be divided and added to two or more layers.

The amount of the slightly soluble metal compound or the complex-forming compound to be incorporated in a layer provided on the support varies depending upon the kind of the compound, particle size of the slightly soluble metal compound, complex-forming reaction rate, etc., but is preferably not more than 50 wt% based on the weight of each coating, with from 0.01 wt% to 40 wt% being more preferable. In the case of providing the complex-forming compound by dissolving in water, the amount of the compound is preferably from 0.005 mol to 5 mols, and particularly preferably from 0.05 mol to 2 mols, per liter. Further, the amount of the complexforming compound in the reaction region to be employed in the present invention is preferably from 1/100 to 100 times, and particularly preferably from 1/10 to 20 times, as much as the amount of the slightly soluble compound.

In applying water to the light-sensitive layer or the dye-fixing layer, methods described, for example, in Japanese Patent Application (OPI) No. 147244/86 may be employed.

The heating means to be employed in the developing and/or transferring step include those means such as those described in Japanese Patent Application (OPI) No. 147244/86, such as a hot plate, iron, hot roller, etc. Alternatively, a layer of a conductive material such as graphite, carbon black, metal or the like may be superposed on the light-sensitive element and/or dye-fixing element to conduct direct heating by energizing the conductive layer.

As to pressure-applying conditions and techniques of applying pressure upon closely contacting the light-sensitive element with the image-fixing element in a superposed manner, those which are described in Japanese Patent Application (OPI) No. 147244/86 may be employed.

To the processing of the photographic element of the present invention may be applied any of various thermally developing apparatuses. For example, those apparatuses which are described in Japanese Patent Application (OPI) Nos. 75247/84, 177547/84, 181353/84, 18951/85, etc., may be desirably employed.

The present invention is now illustrated in greater detail by reference to the following examples, which, however, are not to be construed as limiting the present invention in any way.

EXAMPLE 1

Preparation of a Benzotriazole Silver Salt Emulsion 28 g of gelatin and 13.2 g of benzotriazole were dissolved in 300 ml of water. This solution was stirred while keeping it at 40° C. A solution of 17 g of silver nitrate in 100 ml of water was added thereto over 2 minutes.

The pH of this benzotriazole silver salt emulsion was adjusted to flocculate and remove excess salts. Then, the pH was adjusted to 6.30 to obtain 400 g of a benzotriazole silver salt emulsion.

Preparation of a Silver Acetylide Emulsion 28 g of gelatin and 26.7 g of potassium 4-acetylaminophenyl propiolate were dissolved in 500 ml of water. This solution was stirred while keeping at 40° C. A solution of 17 g of silver nitrate in 100 ml of water was added thereto over 2 minutes, followed by further stirring for 10 minutes.

The pH of this emulsion was adjusted to 6.30, and centrifugation gave 400 g of a silver acetylide emulsion.

Preparation of a Silver Halide Emulsion for the Fifth and the First Layers 600 ml of an aqueous solution containing sodium chloride and potassium bromide and a silver nitrate aqueous solution (prepared by dissolving 0.59 mol of silver nitrate in 600 ml of water) were simultaneously added over 40 minutes at an equal flow rate to a well stirred gelatin aqueous solution (containing 20 g of gelatin and 3 g of sodium chloride in 1,000 ml of water and being kept at 75° C). Thus, a monodispersed cubic silver bromochloride emulsion (bromide: 50 mol %) having a mean particle size of 0.40 μm was prepared.

After washing with water and desalting, 5 mg of sodium thiosulfate and 20 mg of 4-hydroxy-6-methyl1,3,3a,7-tetraazaindene were added to the emulsion to conduct chemical sensitization at 60° C. Thus, there was obtained 600 g of an emulsion.

Preparation of a Silver Halide Emulsion for the Third Layer 600 ml of an aqueous solution containing sodium chloride and potassium bromide and a silver nitrate aqueous solution (prepared by dissolving 0.59 mol of silver nitrate in 600 ml of water) were simultaneously added over 40 minutes at an equal flow rate to a well stirred gelatin aqueous solution (containing 20 g of gelatin and 3 g of sodium chloride in 1,000 ml of water and being kept at 75° C.). Thus, a monodispersed cubic silver chlorobromide emulsion (bromide: 80 mol %) having a mean grain size of 0.35 $\mu$m was prepared.

After washing with water and desalting, 5 mg of sodium thiosulfate and 20 mg of 4-hydroxy-6-methyl-1,3,3a,7-tetraazaindene were added to the emulsion to conduct chemical sensitization at 60° C. Thus, there was obtained 600 g of an emulsion.

Preparation of a Gelatin Dispersion of Dye-Providing Substance 5 g of Yellow Dye-Providing Substance (A), 0.5 g of succinic acid sodium 2-ethylhexyl sulfonate as a surfactant, and 10 g of triisononyl phosphate were weighed, and 30 ml of ethyl acetate was added thereto, followed by heating to about 60° C. to prepare a uniform solution. This solution was stirred and mixed with 100 g of a 10% solution of lime-processed gelatin, then subjected to a homogenizer for 10 minutes at 10,000 rpm to disperse. The resulting dispersion is referred to as a dispersion of yellow dye-providing material.

A dispersion of magenta dye-providing substance was prepared in the same manner as described above except for using Magenta Dye-Providing Substance (B) and 7.5 g of tricresyl phosphate as a high boiling point solvent.

A dispersion of cyan dye-providing substance was prepared in the same manner as with the dispersion of yellow dye-providing substance except for using Cyan Dye-Providing Substance (C).

A multilayer color light-sensitive material of the structure shown in the following was prepared using these dispersions.

| Seventh Layer: | |
|---|---|
| Gelatin | 500 mg/m$^2$ |
| Hardener*$^3$ | 10 mg/m$^2$ |
| Silica*$^5$ | 100 mg/m$^2$ |
| Sixth Layer: | |
| Gelatin | 800 mg/m$^2$ |
| Hardener*$^3$ | 16 mg/m$^2$ |
| Reducing Agent (E) | 200 mg/m$^2$ |
| Fifth Layer: Green-Sensitive Emulsion Layer | |
| Silver chlorobromide emulsion (bromide: 50 mol %) | 400 mg of Ag/m$^2$ |
| Silver acetylide emulsion | 100 mg of Ag/m$^2$ |
| Sensitizing Dye D-1 | $10^{-6}$ mol/m$^2$ |
| Hardener*$^3$ | 16 mg/m$^2$ |
| Yellow Dye-Providing Substance (A) | 400 mg/m$^2$ |
| Gelatin | 1,000 mg/m$^2$ |
| High boiling point solvent*$^4$ | 800 mg/m$^2$ |
| Surfactant*$^2$ | 100 mg/m$^2$ |
| Fourth Layer: Intermediate Layer | |
| Gelatin | 900 mg/m$^2$ |
| Hardener*$^3$ | 18 mg/m$^2$ |
| Zinc hydroxide*$^6$ | 500 mg/m$^2$ |
| Third Layer: Red-Sensitive Emulsion Layer | |
| Silver chlorobromide emulsion (bromide: 80 mol %) | 300 mg of Ag/m$^2$ |
| Silver acetylide emulsion | 100 mg of Ag/m$^2$ |
| Sensitizing Dye D-2 | $8 \times 10^{-7}$ mol/m$^2$ |
| Hardener*$^3$ | 18 mg/m$^2$ |
| Magenta Dye-Providing Substance (B) | 400 mg/m$^2$ |
| Gelatin | 1,000 mg/m$^2$ |
| High boiling point solvent*$^1$ | 600 mg/m$^2$ |
| Surfactant*$^2$ | 100 mg/m$^2$ |
| Second Layer: Intermediate Layer | |
| Gelatin | 800 mg/m$^2$ |
| Hardener*$^3$ | 16 mg/m$^2$ |
| Zinc hydroxide*$^6$ | 500 mg/m$^2$ |
| First Layer: Infrared-Sensitive Emulsion Layer | |
| Silver chlorobromide emulsion (bromide: 50 mol %) | 300 mg of Ag/m$^2$ |
| Benzotriazole silver salt emulsion | 100 mg of Ag/m$^2$ |
| Sensitizing Dye D-3 | $10^{-8}$ mol/m$^2$ |
| Hardener*$^3$ | 16 mg/m$^2$ |
| Cyan Dye-Providing Substance (C) | 300 mg/m$^2$ |
| Gelatin | 1,000 mg/m$^2$ |
| High boiling solvent*$^4$ | 600 mg/m$^2$ |
| Surfactant*$^2$ | 100 mg/m$^2$ |
| Support: | |
| 100 $\mu$m thick polyethylene terephthalate | |

*$^1$Tricresyl phosphate

*$^2$
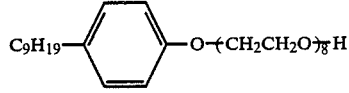

*$^3$1,2-Bis(vinylsulfonylacetamide)ethane
*$^4$(iso-C$_9$H$_{19}$O)$_3$P=O
*$^5$Size: 3 to 5 $\mu$m
*$^6$Size: 0.2 to 0.3 $\mu$m Dye-Providing Substance (A):

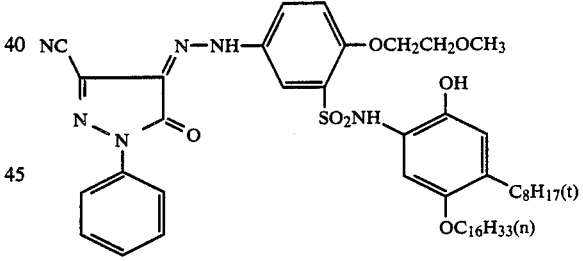

Dye-Providing Substance (B):

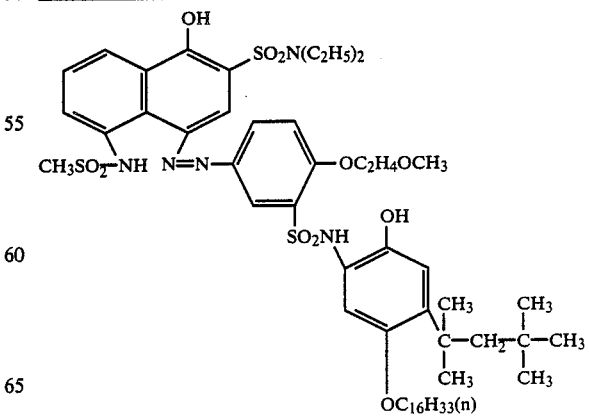

Dye-Providing Substance (C):

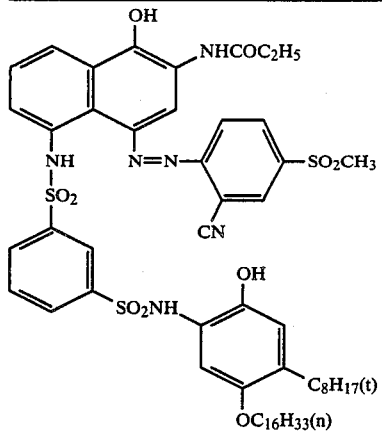

Sensitizing Dye D-1:

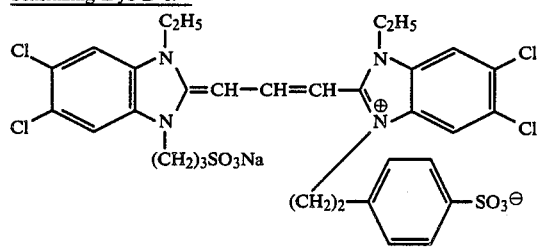

Sensitizing Dye D-2:

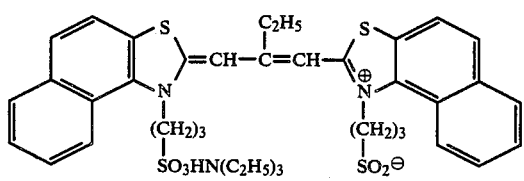

Sensitizing Dye D-3:

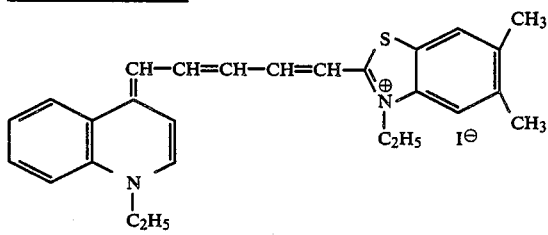

Reducing Agent (E):

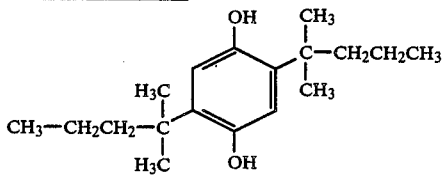

Preparation of the Dye-Fixing Material

The following layers were coated on a polyethylene-laminated paper support to prepare Dye-Fixing Material (A).

| Second Layer: | |
|---|---|
| Gelatin | 0.7 g/m$^2$ |
| Hardener*$^1$ | 0.24 g/m$^2$ |
| First Layer: | |
| Gelatin | 1.4 g/m$^2$ |
| Mordant HP-1 | 2.6 g/m$^2$ |
| Guanidium picolinate | 2.5 g/m$^2$ |
| Support: | |
| 120 μm thick | |

*$^1$CH$_2$—CH—CH$_2$—O—(CH$_2$)$_4$O—CH$_2$—CH—CH$_2$
          \O/                              \O/

HP-1:

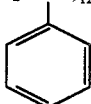

The color light-sensitive material of the above-described multiplayer structure was exposed for 1 second at 500 lux through a G, R or IR (referring to green, red, or infrared, respectively) three-color separation filter (G filter and R filter being constituted by a 500 to 600 nm band-pass filter and a 600 to 700 nm band-pass filter, respectively, and IR filter by a filter transmitting light of 700 nm or longer in wavelength) having continuously changed density using a tungsten bulb.

Water was applied to the emulsion-coated surface of the thus-exposed light-sensitive material in an amount of 7 ml/m$^2$ by means of a wire bar, then the exposed material was superposed on Dye-Fixing Material (A) with coated surfaces facing each other.

The assembly was heated for 20 seconds using hot rollers adjusted so that the temperature of water-applied coatings became 90° to 95° C., then the dye-fixing material was peeled apart from the light-sensitive material, followed by examining brittleness and photographic properties to obtain the results shown in Table 1.

Dye Fixing Materials (B), (C.), (D), (E), (F), (G), (H) and (J) were prepared in the same manner as with Dye-Fixing Material (A) except for changing Mordant HP-1 used in Dye-Fixing Material (A) to the following Mordant HP-2, Polymers P-1, P-2, P-9, P-19, P-20, P-21 and P-22 of the present invention, respectively. The same procedures as with Dye-Fixing Material (A) were conducted using these Dye-Fixing Materials (B) to (J) to examine brittleness and photographic properties. The results are tabulated in Table 1.

HP-2:

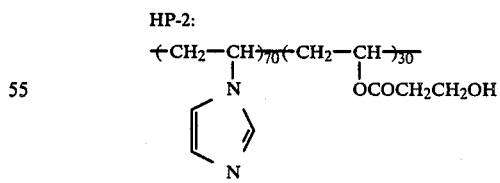

TABLE 1

| Dye-Fixing Material | Mordant | Brittleness* (mm) | Maximum Density | | | Note |
|---|---|---|---|---|---|---|
| | | | Yellow | Magenta | Cyan | |
| (A) | HP-1 | 22 | 2.12 | 2.34 | 2.48 | Comparison |
| (B) | HP-2 | 20.8 | 2.01 | 2.22 | 2.41 | Comparison |
| (C) | P-1 | 4.0 | 2.11 | 2.32 | 2.46 | Invention |

TABLE 1-continued

| Dye-Fixing Material | Mordant | Brittleness* (mm) | Maximum Density | | | Note |
| --- | --- | --- | --- | --- | --- | --- |
| | | | Yellow | Magenta | Cyan | |
| (D) | P-2 | 3.2 | 2.14 | 2.33 | 2.46 | Invention |
| (E) | P-9 | 4.2 | 2.08 | 2.29 | 2.42 | Invention |
| (F) | P-19 | 10.6 | 2.12 | 2.34 | 2.48 | Invention |
| (G) | P-20 | 9.4 | 2.09 | 2.33 | 2.49 | Invention |
| (H) | P-21 | 11.2 | 2.11 | 2.28 | 2.45 | Invention |
| (J) | P-22 | 10.8 | 2.10 | 2.30 | 2.46 | Invention |

Note: Dye-Fixing Materials (A) and (B) are comparative samples, and others are samples according to the present invention.
*In the evaluation of brittleness, the dye-fixing material was controlled in humidity by placing in a thermostat at 25° C. and 25% RH for 2 hours, and then was bent in such a manner that the coated surface was exposed outside, and a radius of curvature at which cracking occurred was indicated (mm).

As is shown in Table 1, it is clear that, by using the polymeric mordants of the present invention, values of brittleness were reduced and cracks were markedly prevented. In addition, it is seen that the mordants of the present invention provide the same or superior mordantability as compared to conventional mordants. In addition, dye images formed in the image-fixing materials of the present invention were stable even when exposed to light and humid heat conditions for a long time.

The present invention provides mordants having excellent mordanting ability and which are capable of retaining mordanted dyes in a stable form against light and humid heat conditions for a long period of time. The mordant layers of the present invention showed the property of resisting crack formation.

While the invention has been described in detail and with reference to specific embodiments thereof, it will be apparent to one skilled in the art that various changes and modifications can be made therein without departing from the spirit and scope thereof.

What is claimed is:

1. A photographic element comprising a layer having a polymeric mordant which comprises repeating units represented by formula (I) and (II)

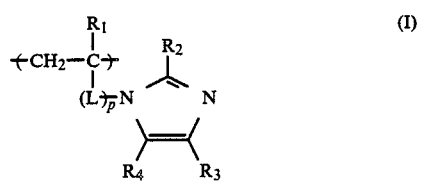

wherein
$R_1$, $R_2$, $R_3$ and $R_4$ each represents a hydrogen atom or a straight or branched alkyl group,
L represents a divalent linking group, and
p represents 0 or 1;

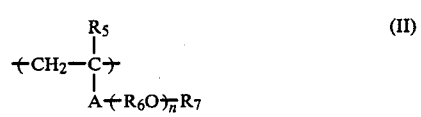

wherein
$R_5$ represents a hydrogen atom or a straight or branched alkyl group containing from 1 to 4 carbon atoms,
$R_6$ represents an alkylene group,
$R_7$ represents a straight or branched alkyl group containing from 1-20 carbon atoms,
A represents a divalent linking group bound to the main polymer chain through a carbon atom, and
n represents an integer of from 1 to 30.

2. A photographic element as in claim 1, wherein $R_1$, $R_2$, $R_3$ and $R_4$ each represents a hydrogen atom or a straight or branched alkyl group containing from 1 to 6 carbon atoms; and L represents a divalent linking group containing from 1 to 20 carbon atoms.

3. A photographic element as in claim 2, wherein $R_1$, $R_2$, $R_3$ and $R_4$ each represents a hydrogen atom, a methyl group, or an ethyl group; and L represents a divalent linking group selected from

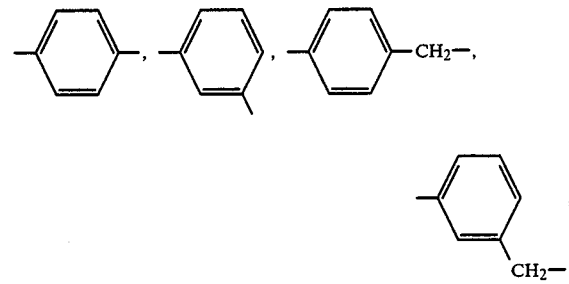

$-CO_2-$, $-CONH-$, $-CO_2-CH_2CH_2-$, $-CO_2-CH_2CH_2CH_2-$, $-CONHCH_2-$, $-CONHCH_2CH_2-$, and $-CONHCH_2CH_2CH_2-$.

4. A photographic element as in claim 1, wherein said polymeric mordant is used in an amount such that the ratio of said polymeric mordant to the binder in said element is in the range of from about 20/80 to about 80/20 by weight.

5. A photographic element as in claim 1, wherein said polymeric mordant is used in a coated amount of from about 0.2 to amout 15 g/m².

6. A photographic element as in claim 5, wherein said polymeric mordant is used in a coated amount of from 0.5 to 8 g/m².

7. A photographic element as in claim 1, wherein A represents $-COO-(X)_m-$, $-CONR_{12}-(X)_m-$, or

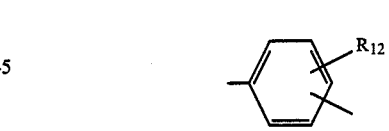

wherein $R_{12}$ represents a hydrogen atom, a straight or branched alkyl group containing 1 to 20 carbon atoms, or $-(X)_m-(R_6O)_n-R_7$ wherein X represents a divalent linking group.

8. A photographic element comprising a layer having a polymeric mordant which comprises repeating units represented by formula (I) and repeating units represented by at least one of formulae (III) and (IV);

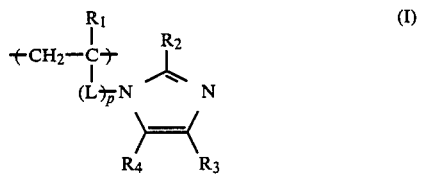

wherein
$R_1$, $R_2$, $R_3$ and $R_4$ each represents a hydrogen atom or a straight or branched alkyl group, L represents a divalent linking group, and
p represents 0 or 1;

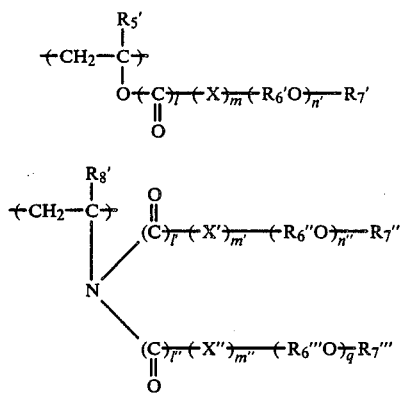

wherein
R$_{5'}$ and R$_8$ each represents a hydrogen tom or a straight or branched alkyl group containing from 1 to 6 carbon atoms;
R$_6$, R$_6''$ and R$_6'''$ each represents a divalent hydrocarbon group,
R$_7'$, R$_7''$, and R$_7'''$ each represents a hydrogen atom, a straight or branched alkyl group containing from 1 to 20 carbon atoms, an aryl group containing from 6 to 20 carbon atoms, or aralkyl group containing
X, X' and X'' each represents a divalent linking group, l, l', l'', m, m' and m'' each represents 0 or 1, n' and n'' each represents an integer of from 2 to 30, and
q represents an integer of from 0 to 30.

9. A photographic element as in claim 8, wherein R$_6'$, R$_6''$, and R$_6'''$ each represents an alkylene group or an arylene group; R$_7'$, R$_7''$, and R$_7'''$ each represents a hydrogen atom, a straight or branched alkyl group, or a phenyl group; and n' and n'' each represents an integer of from 3 to 30.

10. A photographic element as in claim 9, wherein R$_6'$, R$_6''$, and R$_6'''$ each represents an alkylene group; R$_7'$, R$_7''$, and R$_7'''$ each represents a straight or branched alkyl group; n' and n'' each represents an integer of from 4 to 30.

11. A photographic element as in claim 8, wherein said repeating units represented by formula (IV) are repeating units represented by formula (V)

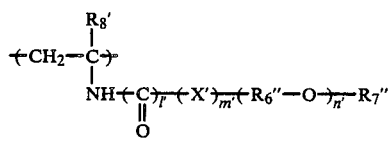

wherein R$_8'$ represents a hydrogen atom or a straight or branched alkyl group; R$_6''$ represents a divalent hydrocarbon group; R$_7''$ represents a hydrogen atom, a straight or branched alkyl group, an aryl group, or an aralkyl group; X' represents a divalent linking group; l' and m' each represents 0 or 1; and n' represents an integer of from 2 to 30.

12. A photographic element as in claim 1, wherein the content of said repeating units represented by formula (I) in said polymeric mordant is in the range of from about 10 to about 95 mol % based on the total repeating units in said polymer.

13. A photographic element as in claim 12, wherein the content of said repeating units represented by formula (I) in said polymeric mordant is in the range of from 40 to 90 mol % based on the total repeating units in said polymer.

14. A photographic element as in claim 1, wherein the content of said repeating units represented by formulae (II) in said polymeric mordant is in the range of from about 2 to about 70 mol % based on the total repeating units in said polymer.

15. A photographic element as in claim 14, wherein the content of said repeating units represented by formulae (II) in said polymeric mordant is in the range of from 5 to 50 mol % based on the total repeating units in said polymer.

16. A photographic element as in claim 1, wherein said polymeric mordant has a molecular weight of from about $5 \times 10^3$ to about $1 \times 10^7$.

17. A photographic element as in claim 16, wherein said polymeric mordant has a molecular weight of from $1 \times 10^4$ to $2 \times 10^6$.

18. A photographic element as in claim 8, wherein the content of said repeating units represented by formula (I) in said polymeric mordant is in the range of from about 10 to about 95 mole % based on the total repeating units in said polymer.

19. A photographic element as in claim 18, wherein the content of said repeating units represented by formula (I) in said polymeric mordant is in the range of from 40 to 90 mol % based on the total repeating units in said polymer.

20. A photographic element as in claim 8, wherein said polymeric mordant has a molecular weight of from about $5 \times 10^3$ to about $1 \times 10^7$.

21. A photographic element as in claim 20, wherein said polymeric mordant has a molecular weight of from $1 \times 10^4$ to $2 \times 10^6$.

22. A photographic element as in claim 8, wherein said polymeric mordant is used in an amount such that the ratio of said polymeric mordant to the binder in said element is in the range of from about 20/80 to about 80/20 by weight.

23. A photographic element as in claim 8, wherein said polymeric mordant is used in a coated amount of from about 0.2 to about 15 g/m$^2$.

24. A photographic element as in claim 23, wherein said polymeric mordant is used in a coated amount of from 0.5 to 8 g/m$^2$.

25. A photographic element as in claim 8, wherein the content of said repeating units represented by at least one of formulae (III) and (IV) in said polymeric mordant is in the range of from about 2 to about 70 mol % based on the total repeating units in said polymer.

26. A photographic element as in claim 25, wherein the content of said repeating units rperesented by at least one of formulae (III) and (IV) in said polymeric mordant is in the range of from 5 to 50 mol % based on the total repeating units in said polymer.

* * * * *